US006989428B1

(12) United States Patent
Bianconi et al.

(10) Patent No.: US 6,989,428 B1
(45) Date of Patent: Jan. 24, 2006

(54) METHODS OF PREPARING POLYSILYNES

(75) Inventors: Patricia A. Bianconi, Sunderland, MA (US); Michael W. Pitcher, Davis, CA (US); Scott Joray, Superior, CO (US)

(73) Assignee: University of Massachusetts, Boston, MA (US)

( * ) Notice: Subject to any disclaimer, the term of this patent is extended or adjusted under 35 U.S.C. 154(b) by 235 days.

(21) Appl. No.: 10/394,827

(22) Filed: Mar. 21, 2003

Related U.S. Application Data

(60) Provisional application No. 60/366,851, filed on Mar. 22, 2002.

(51) Int. Cl.
C08G 77/08 (2006.01)
(52) U.S. Cl. .......................... 528/14; 556/430; 501/88
(58) Field of Classification Search ................ 556/430; 528/14
See application file for complete search history.

(56) References Cited

U.S. PATENT DOCUMENTS

| | | | |
|---|---|---|---|
| 4,276,424 A | | 6/1981 | Peterson et al. |
| 4,414,403 A | * | 11/1983 | Schilling et al. ............ 556/430 |
| 4,472,591 A | | 9/1984 | Schilling et al. |
| 4,537,942 A | | 8/1985 | Brown-Wensley et al. |
| 4,611,035 A | | 9/1986 | Brown-Wensley et al. |
| 4,704,444 A | | 11/1987 | Brown-Wensley et al. |
| 4,921,321 A | * | 5/1990 | Weidman .................... 385/130 |
| 5,091,485 A | | 2/1992 | Noireaux et al. |
| 5,426,160 A | | 6/1995 | Bianconi et al. |
| 5,436,315 A | | 7/1995 | Rieke |
| 5,439,780 A | * | 8/1995 | Joshi et al. ................. 430/296 |
| 5,463,018 A | | 10/1995 | Rieke |
| 5,516,884 A | | 5/1996 | Bianconi |
| 6,720,620 B1 | | 4/2004 | Partee et al. |

FOREIGN PATENT DOCUMENTS

WO       WO 93/14164        7/1993

OTHER PUBLICATIONS

Best et al., "Structural Analysis of Carbyne Network Polymers," J. Amer. Chem. Soc. 117:9521-9258 (1995).
Bianconi et al., "Polymers for Lightwave and Integrated Optics: Technology and Applications," Optical Engineering Series, Marcell Decker: New York, pp. 195-207 (1991).
Bianconi et al., "Poly(ηhexylsilyne): Synthesis and Properties of the First Alkyl Silicon [RSi]$_n$ Network Polymer," J. Am. Chem. Soc. 110:2342-2345 (1988).
Bianconi et al., "Ultrasound-Mediated Reductive Condensation Synthesis of Silicon-Silicon Bonded Network Polymers," Macromolecules 22:1697-1704 (1989).
Birot et al., "Comprehensive Chemistry of Polycarbosilanes, Polysilazanes, and Polycarbosilazanes as Precursors of Ceramics," Chem. Rev. (1995), 95, 1443-1477.
Bridgeman, "Synthetic Diamonds," Sci. Am., 193:42-6 (1955).
Brough et al., "The Permethylcyclosilanes $(Me_2Si)_5$ through $(Me_2Si)_{35}{}^1$," J. Am. Chem. Soc. 103:3049-3056 (1981).
Bundy et al., "Man-made Diamonds," Nature 176:51-55 (1955).
Cheng et al., "The microstructure dependence on processing temperature in sol-gel derived thin ferroelectric films of LiNbO3 on SiO2/Si substrate," Ferroelectrics 231:805-810 (1999).
Corriu et al., "From Preceramic Polymers with Interpenetrating Networks to SiC/MC Nanocomposites," Chem. Mater. 12:805-811 (2000).
Czubarow et al., "Sonochemical Synthesis of a Poly (methylsilane), a Precursor for Near-Stoichiometric SiC," Macromolecules 31:229-238 (1998).
Ding et al., "Annealing effect on electron field-emission properties of diamond-like nanocomposite films," J. Appl. Phys. 88:5087-5092 (2000).
Ding et al., "Electron field emission from Ti-containing tetrahedral amorphous carbon films deposited by filtered cathodic vacuum arc," J. Appl. Phys. 88:6842-6847 (2000).
Furukawa et al., "Optical Properties of Silicon Network Polymers," Macromolecules 23:3423-3426 (1990).
Gozzi and Yoshida, "Thermal and Photochemical Coversion of Poly(methylsilane) to Polycarbosilane," Macromolecules 28:7235-7240 (1995).
Huang et al., "A new polymeric material for optical switching," Appl. Phys. B-Lasers Opt. 68:217-220 (1999).
Huang et al., "Conversion of diamond clusters from a polymer by Nd:YAG pulsed laser (532 nm) irridiation," Appl. Surf. Sci. 151:244-250 (1999).
Huang et al., "Electron field emission from polymer films treated by a pulsed ultraviolet laser," J. Appl. Phys. 90:2601-2605 (2001).
Huang et al., "Conversion of Diamond-Like Carbon Film from Phenylcarbyne Polymer under Pulsed Green Laser Irradiation," Jpn. J. Appl. Phys. Part 1—Regul. Pap. Short Notes Rev. Pap. 39:1154-1159 (2000).
Huang et al., "Diamond-like films formed by pulsed laser irradiation of phenylcarbyne polymer," Surf. Coat. Technol. 125:25-29 (2000).
Iseki et al., "An Efficient Process of Cross-Linking Poly (methylsilane) for SiC Ceramics," Chem. Mater. 13:4163-4169 (2001).
Kipping et al., "Organic Derivatives of Silicon. Part XL, Attempts to prepare Unsaturated Compounds from Phenylsilicon Tricholoride," J. Chem. Soc. PGs 1180-1191 (1929).

(Continued)

*Primary Examiner*—Margaret G. Moore
(74) *Attorney, Agent, or Firm*—Fish & Richardson P.C.

(57) ABSTRACT

The invention involves new syntheses for poly(methyl- and ethyl-silyne). The invention also includes silicon carbide (SiC) ceramics that can be produced from poly(methylsilyne), as well as other ceramics, which can be produced from these precursors by modified processing conditions.

36 Claims, 6 Drawing Sheets

OTHER PUBLICATIONS

Laine et al., "Preceramic Polymer Routes to Silicon Carbide," Chem. Mater. 5, 260-279 (1993).

Li and Edirisinghe, "Controlled synthesis of Silicon arbide-aluminium nitride composites using a pre-ceramic polymer route," J. Mater. Sci. Letters 21:21-23 (2002).

Liu et al., "Investigation of the Pyrolytic Conversion of Poly(silylenemethylene) to Silicon Carbide," Chem. Mater. 11:2038-2048 (1999).

Liu et al., "Micro-Raman spectroscopic analysis of tetrahedral amorphous carbon films deposited under varying conditions," J. Appl. Phys. 86:6078-6083 (1999).

Liu et al., "The effect of nitrogen on the mechnical properties of tetrahedral amorphous carbon films deposited with a filtered cathodic vacuum arc," Surf. Coat. Technol. 121:601-606 (1999).

Lu et al., "Raman spectroscopy of phenylcarbyne polymer films under pulsed green laser irradiation," Appl. Phys. 87:945-951 (2000).

Matyjaszewski et al., "Homopolymerization and copolymerization of phenyltrichlorosilane by sonochemical reductive coupling in the presence of sodium," Polymer Bulletin 22, 253-259 (1989).

R.D. Miller and J. Michl, "Polysilane High Polymers," Chemical Reviews, 89:1359-1410 (1989).

Mu et al., "Some Further Observations on Polymethylsilane as a Precursor for Silicon Carbide," Appl. Organomet. Chem. 8:95-100 (1994).

Narisawa et al., "An Efficient Process of Cross-Linking Poly(methylsilane) for SiC Ceramics," Chem. Mater. 13:4163-4169 (2001).

Ning et al., "Selected-area diamond deposition on Si substrates pre-treated in different ways," Surf. Coat. Technol. 63:159-165 (1994).

O'Brien et al., "Chemical Modification of Halogenated Polystyrene Resins Utilizing Highly Reactive Calcium and the Formation of Calcium Cuprate Reagents in the Preparation of Functionalized Polymers," J. Org. Chem., 57:2667-2677 (1992).

Riecke and Chen, "Facile Synthesis of Poly(phenylcarbyne): a Precursor for Diamondlike Carbon," Chem. Mat. 576-577 (1994).

Richter et al., "Organosilicon Polymers—Synthesis, Architecture, Reactivity and Applications," Applied Organometallic Chemistry (1997), 11, 71-106.

Rushkin and Interrante, "Synthesis of Poly (silylenemethylenes) through Reactions Carried Our on Preformed Polymers. 2. Investigation of the Hydorsilation Route to substituted Poly(silylenemethylenes)", Macromolecules 29:5784-5787 (1996).

Seyferth, "Preceramic Polymers: Past, Present, and Future," Adv. Chem. Ser. 245:131-160 (1995).

Smith et al., "Functionalization of Polysilyne Networks for Enhanced Surface Properties," Chem. Mater., 5:245-247 (1993).

Sun et al., "An amorphous hydrocarbon diamond-like polymer as a precursor for diamond growth," Thin Solid Films 377:203-207 (2000).

Sun et al., "Field emission from polymer-converted carbon films by ultraviolet radiation," Appl. Phys. Lett. 78:2009-2011 (2001).

Sun et al., "Low pressure polymer precursor process for process for synthesis of hard glassy carbon and diamond films," Diam. Relat. Mat. 6:230-234 (1997).

Sun et al., "Morphological features of diamond films depending on substrate temperartures via a low pressure polymer precursor process in a hot filament reactor," Diam. Relat. Mat. 7:939-943 (1998).

Sun et al., "Structure and properties of hard carbon films depending on heat treatment temperatures via polymer precursor," Diam. Relat. Mat. 8:1107-1113 (1999).

Sun et al., "UV Raman characteristics of nanocrystalline diamond films with different grain size," Diam. Relat. Mat. 9:1979-1983 (2000).

Sun et al., "Diamond film deposited on a silica substrate with a ZnO:AI intermediate layer by hot-filament chemical vapor deposition," J. Appl. Phys. 76:4446-4447 (1994).

Sun et al., "Properties and structures of diamond-like carbon film deposited using He, Ne, Ar/methane mixture by plasma enhanced chemical vapor deposition," J. Appl. Phys. 87:8122-8131 (2000).

Sun et al., "Morphological features of diamond films grown on diamond-like carbon films synthesized from polymer by chemical vapor deposition," J. Cryst. Growth 173:402-407 (1997).

Sun et al., "Low pressure polymer precursor for synthesis of diamond at low temperature," J. Mater. Sci. Lett. 16:933-935 (1997).

Sun et al., "Light Scattering and Viscoelasticity of Polymer Solutions," Macromolecules 27:5667-5673 (1994).

Sun et al., "Enhancement of graphite surface mechanical properties using carbon film from polymer precursor," Surf. Coat. Technol. 122:277-280 (1999).

Sun et al., "IR spectral investigation of the pyrolysis of polymer precursor to diamond-like carbon," Surf. Coat. Technol. 79:108-112 (2000).

Sun et al., "Properties of furnace crystallized polysilicon films prepared by r.f. sputtering," Thin Solid Films 288:224-228 (1996).

Sun et al., "Nucleation enhancement of diamond using diamond-like carbon film synthesized from polymer as an intermediate layer," Thin Solid Films 257:28-31 (1995).

Sun et al., "Selective deposition of diamond onto Si substrates using tetraethylorthosilicate $SiO_2$ films as masks," Thin Solid Films 289:1-5 (1996).

Sun et al., "Growth of flake-like diamond crystal using polymer precursor," Thin Solid Films 308:159-162 (1997).

Sun et al., High rate deposition of diamond-like carbon films by magnetically enhanced plasma CVD, Thin Solid Films 356:146-150 (1999).

Sun et al., "Effects on the depostion and mechanical properties of diamond-like carbon film using different inert gases in methane plasma," Thin Solid Films 377:198-202 (2000).

Sun et al., "Synthesis of diamond via low pressure polymer precursor using microwave plasma-two dimensional growth phenomena," Mater. Sci. Eng. B-Solid State Mater. Adv. Technol. 47:167-170 (1997).

Szymanski et al., "Polygermynes: Synthesis and Properties of Germanium-Germanium Bonded Network Polymers," Macormolecules 26;869-871 (1993).

Tay et al., "Raman studies of tetrahedral amorphous carbon films deposited by filtered cathodic vacuum arc," Surf. Coat. Technol. 105:155-158 (1998).

Tsao et al., "Studies of the Solid-State Conformation of Polysilaethylene: An Organic/Inorganic Hybrid Polymer with an Alternating C/Si Backbone," Macromolecules 29:7130-7135 (1996).

van Walree et al., "Structural, Photophysical, and Conductive Properties of n-Hexyl Substituted Hybrid Polysilylene-Polysilyne Networks," Macromolecules 29:7362-7373 (1996).

Vermeulen et al., "Electrosynthesis of new polysilynes: poly(methylsilyne) and poly(cyclohexylsilyne-co-methylsilyne)," Polymer 41(2):441-444 (2000).

Visscher and Bianconi, "Synthesis and Characterization of Polycarbynes, a New Class of Carbon-Based Network Polymers," J. Am. Chem. Soc. 116:1805-1811 (1994).

Visscher et al., "Poly(phenylcarbyne): A Polymer Precursor to Diamond-Like Carbon," Science 260:1496-1499 (1993).

Wang et al., "Synthesis of diamond from polymer seeded with nanometer-sized diamond particles," J. Cryst. Growth 181:308-313 (1997).

Wang et al., "Atomic hydrogen assisted the conversion of polymer into diamond," Mater. Sci. Eng. B-Solid State Mater. Adv. Technol. B52:216-219 (1998).

Watanabe and Matsuda, "Amorphous silicon structure of heat-treated poly(η-propylsilyne) studied by far-infared spectroscopy," Chemical Physical Letters 207:132-136 (1993).

Watanabe and Matsuda, Effect of si-skeleton dimensionality on optical and electrical properties of poly(methylphenylsilylene) and poly (phenylsilyne), Synthetic Metals 74:191-195 (1995).

Watanabe and Matsuda, "Electrical and Optical-Properties of Heat-Treated Silicon Network Polymers," Chemistry Letters, Chemical Soc. Japan, Tokyo, (7):1101-1104 (1991).

Watanabe et al., "Micropattern of Inorganic Film Prepared by UB-Irradiation and Heat-Treatment of Polyalkylsilyne Film," Japan J. Applied Physics, Minato-Ku Tokyo, Part II-Letters 34(4A):L452-L454 (1995).

Watanabe and Matsuda, "Origin of broad visible emission from branched polysilane and polygermane chains," Japan J. of Applied Physics Part I-Regular Papers Short Notes & Review Papers 40(11):6457-6463 (2001).

Watanabe et al., "Formation of polysilane film by laser CVD," Think Solid Films 312:123-129 (1998).

Watanabe et al., "Photochemical Properties of Network and Branched Polysilanes," Macromolecules 26:2111-2116 (1993).

Watanabe et al., "SiC/SiO$_2$ micropatterning by ultraviolet irradiation and heat treatment of a poly(phenylsilyne) film," J. Appl. Phys. 77(6):2796-2800 (1995).

Weidman et al., "Sonochemical Na/K alloy emulsion synthesis of polysilynes," Ultrasonics 28:310-315 (1990).

Weinmann et al., "Synthesis and Thermal Behavior of Novel Si-B-C-N Ceramic Precursors," Chem. Mater. 12:623-632 (2000).

West and Indriksons, "Cyclic Polysilanes. VI. Bicyclic and Cage Permethylcyclopolysilanes," J. Amer. Chem. Soc. 94(17):6110-6115 (1972).

Wilson and Weidman, "Exited-State Dynamics of One- and Two-Dimensional σ-Conjugat4ed Silicon Frame Polymers: Dramatic Effects Branching in a Series of Hexylsilyne-Branced Poly(hexylmethylsilylene) Copolymers," J. Phys. Chem. 95:4568-4572 (1991).

Wood, T.G. Ph.D. "Polymeric Precursors to Silicon Carbide," Dissertation, Massachusetts Institute of Technology, Cambridge, MA Chapter 4 (1984).

Wu et al., "Organocalcium Chemistry: Preparation and Reactions of Higly Reactive Calcium," J. Org. Chem. 55:5045-51 (1990).

Xiong et al., "Facile Formation of Substituted 2-Butene-1, 4-Diylmagnesium Using Highly Reactive Magnesium: A Simple Approach to Complex Carbocylces and Functionalized Ketones," J. Org. Chem. 54:3247-49 (1989).

Zhou et al., "Study of the growth rate of diamond film by hot-filament CVD," Mater. Sci. Eng. B-Solid State Mater. Adv. Technol. 25;47-52 (1994).

* cited by examiner

METHODS OF PREPARING POLYSILYNES

RELATED APPLICATION

This application claims priority from U.S. Provisional Application Ser. No. 60/366,851, filed Mar. 22, 2002, the contents of which is incorporated herein by reference in its entirety.

TECHNICAL FIELD

This invention relates to new methods of preparing poly(methylsilynes) and poly(ethylsilynes).

BACKGROUND

Silicon carbide (SiC) has been used in applications requiring a hard, lightweight, temperature-and-wear-resistant material. SiC has good fracture strength, hardness, low theoretical density ($\rho$=3.21 g/cc) and thus relatively high strength/weight ratio. It is an attractive material for numerous applications. Conventionally produced SiC materials are manufactured using SiC powder processing and sintering. In this process, forming shaped products can be difficult and typically requires temperatures in excess of 2100° C. A number of chemical approaches based on polymer precursors have been developed for the synthesis of SiC (see for example, Laine et al., *Chem. Mater.* (1993), 5, 260; Richter et al., *Applied Organometallic Chemistry* (1997), 11, 71; Seyferth, *Adv. Chem. Ser.* (1995), 245, 131; and Birot et al. *Chem. Rev.* (1995), 95, 1443). Polymer precursors can offer some advantages over the conventional solid-state processing of SiC. However, some polymers lack the needed degree of processability or require difficult syntheses. The low char yields of most precursors lead to excessive shrinkage and cracking in the ceramic products and deterioration of mechanical properties. The ceramics are often rich in either Si or C, which again may lead to a degradation of the desired properties.

Polymethylsilane (PMS) syntheses give high-yield, near stoichiometric SiC ceramics upon pyrolysis. The syntheses involve producing pyrophoric polymers with the formula $(CH_3Si)_x(CH_3S1H)_y$, which must be further crosslinked by some mechanism (for example, borate $(B[OSi(CH_3)_3)_3]_3)$ thermolysis) to give ceramics in high yield. Chain-terminating agents (such as $(CH_3)_3SiCl$) have been added to such systems, allowing ceramic yields of up to 64%. Polyvinylsilane has been added to PMS as a further pyrophoric ceramic precursor. Stabilization with 2,6 di-t-butyl-4-methylphenol (BHT) is generally required for all pyrophoric PMS syntheses. Syntheses of this type tend to be multistep and fairly complex.

Polysilynes were synthesized by Bianconi and Weidman in 1988 (Bianconi et al., J. Am. Chem. Soc. (1988), 110, 2342). The synthesis generally involves the reduction of alkyl- or arylsilicon trihalides with liquid NaK. High intensity ultrasound is used to ensure rapid and a more homogeneous reaction environment. These silicon-silicon bonded network polymers adopt a unique structure, in which each silicon bears one pendant group and is joined by three single bonds to three other silicon atoms, forming a continuous random network backbone. These silicon network polymers have a distinctive yellow color, very broad NMR resonances, and a broad and intense UV absorption band edge tailing into the visible. Recently Huang and Vermeulen have synthesized these network polymers electrochemically (*Chem. Commun.* (1998), 247). However, it has been reported that Wurtz coupling of methyltrichlorosilane yields a white intractable solid, unsuitable for processing into SiC (see Brough et al., *J. Am. Chem. Soc.* (1981), 103, 3049; West et al., *J. Am. Chem. Soc.* (1972), 94, 6110; Matyjaszewski et al., *Polymer Bulletin* (1989), 22, 253; Bianconi et al., *Macromolecules* (1989), 22, 1697; and Vermeulen et al., *Polymer* (2000), 41(2), 441.

SUMMARY

The invention is based, in part, on the discovery of new methods of synthesis for poly(methylsilyne), $(CH_3Si)_n$, and poly(ethylsilyne), $(CH_2CH_3Si)_n$, and the use of these new methods to make new non-pyrophoric poly(methyl- or ethyl-silyne) silicon carbide precursors, as well as films and ceramics made from these precursors.

In general, the invention features a novel synthesis of poly(methyl- or ethyl-silyne) by a modified Wurtz-type coupling mechanism. The reaction is straightforward and yields a non-pyrophoric polymer, which can be used as an SiC preceramic polymer. The polymer is soluble in tetrahydrofuran and other common organic solvents, which enables the formation of films and fibers. The ceramic resulting from the pyrolysis of poly(methyl- or ethyl-silyne) is produced in high yields, and is a perfectly stoichiometric SiC. The SiC ceramic film produced from the PMSy precursor is smooth, continuous, and essentially defect free compared to films produced by other known methods.

In general, the invention features methods of making poly(methylsilyne) by contacting a halogenated methylsilane with a metallic reagent to produce a reaction mixture; homogenizing the reaction mixture to produce a homogenized reaction mixture; adding to the homogenized reaction mixture a solvent to aid in completing the reaction; refluxing the homogenized reaction mixture for at least about 6 hours to produce a first refluxed reaction mixture; contacting the first refluxed reaction mixture with an alkylating agent to produce an end-capped reaction mixture; refluxing the end-capped reaction mixture to produce a second refluxed reaction mixture; and quenching the second refluxed reaction mixture with an aqueous solvent that lacks any alcohol to produce non-pyrophoric poly(methylsilyne).

In these methods, the aqueous solvent can be water, the solvent can be tetrahydrofuran (THF), the halogenated methylsilane can be methyltrichlorosilane, the metallic reagent can be a sodium potassium alloy such as NaK, the alkylating agent can be methyllithium, the halogenated methyl silane can mixed with a non-polar solvent (e.g., pentane), and ultrasound can be used to perform the homogenization.

In similar methods, poly(ethylsilyne) can be made by contacting a halogenated ethylsilane with a metallic reagent to produce a reaction mixture; homogenizing the reaction mixture to produce a homogenized reaction mixture; slowly adding to the homogenized reaction mixture a solvent, wherein at least 1.0 ml of the solvent is added drop-wise, to aid in completing the reaction; adding to the homogenized reaction mixture an alkylating agent to produce an end-capped reaction mixture; and quenching the end-capped reaction mixture with an aqueous solvent that lacks any alcohol to produce non-pyrophoric poly(ethylsilyne). Thus, refluxing steps are not required, but can be included as in the methods of making poly(methylsilynes), and the solvent, such as THF must be added slowly. The specific components can be as listed above, except that the halogenated ethylsilane can be ethyltrichlorosilane.

In another aspect, the invention features methods of making ceramics, such as silicon carbides, by forming poly(methylsilyne), or poly(ethylsilyne), according to the methods described herein; and heating the poly(methyl- or ethyl-silyne) to a temperature of at least 200° C. (e.g., at least 500, 750, 1000, 1500, or 1600° C.) to form the ceramic. The ceramic can be within 5% of stoichiometric, or can be substantially stoichiometric silicon carbide, and the poly (methyl- or ethyl-silyne) can be heated by exposure to a plasma or a laser. The new ceramics can have a mean square roughness of less than 200 Å, scanned over 5 microns or larger scan regions, such as 2 mm.

In another embodiment, the invention also features methods of forming films of poly(methyl- or ethyl-silyne) by forming poly(methyl- or ethyl-silyne) as described herein; solubilizing the poly(methyl- or ethyl-silyne) in a solvent; and coating the solubilized poly(methylsilyne) onto a substrate to form a film. The substrate can be aluminum, and the solvent can be tetrahydrofuran.

As used herein "substantially stoichiometric silicon carbide" is material in which the atomic ratio of silicon to carbon is within 5% of 1:1.

A non-pyrophoric polymer is one that does not ignite or produce a spark when exposed to air.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DETAILED DESCRIPTION

Figure 1:
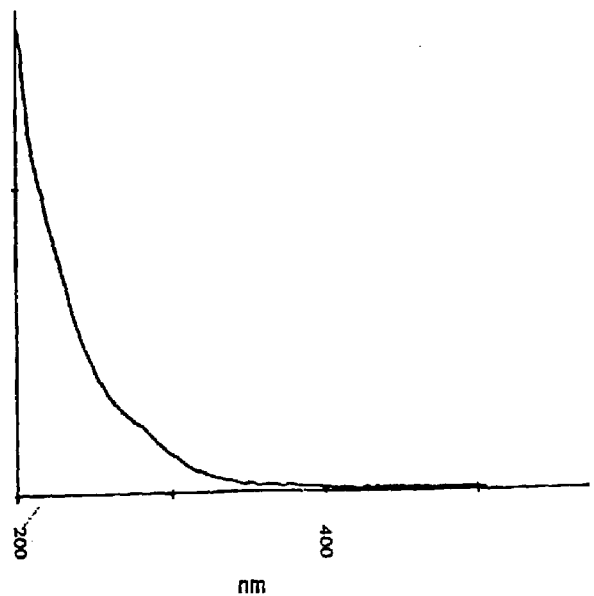
FIG. 1 is a ultraviolet/visible spectrum of poly(methylsilyne).

The invention provides a new and simple modified Wurtz coupling reaction to prepare poly(methyl- or ethyl-silyne), which polymers have previously been impossible to produce using standard Wurtz coupling reactions. The reaction is straightforward and yields a non-pyrophoric polymer, which can be used as an SiC preceramic polymer. The polymer is soluble in tetrahydrofuran and other common organic solvents, which enables the formation of films and fibers. The ceramic resulting from the pyrolysis of poly(methyl- or ethyl-silyne) is produced in high yields, and is a perfectly stoichiometric SiC. The SiC ceramic films produced from the precursors are smooth, continuous, and essentially defect-free.

Methods of Making Poly(methyl- or ethyl-silyne)

Poly(methylsilynes) (PMSy) and poly(ethylsilynes) (PEtSy) are prepared by a modified Wurtz coupling reaction. Suitable starting materials include alkyltrihalosilanes or alkytrialkoxysilanes, such as, for example, methyltrichlorosilane, methyltrimethoxysilane, ethyltrichlorosilane, or ethyltrimethoxysilane. The starting material can be reacted with a reagent used in the known Wurtz reaction such as silver, zinc, activated copper, pyrophoric lead, lithium, complexed nickel, potassium, sodium, or cesium metals. Alloys of these metals can also be used. Suitable reagents include NaK, NaHg, KHg, NaKHg, and similar alloys, in any ratio. For example, NaK in an approximately 1:1 ratio is suitable for this reaction. A solvent can optionally be used. Nonprotic solvents including a heteroatom such as nitrogen, sulfur, or oxygen can be employed. Such solvents can assist in the formation of emulsions. Such solvents include ethers, amines, including and not limited to dimethylsulfoxide, acetonitrile, dimethylformamide, acetone, hexamethylphosphoramide, tetrahydrofuran, diethyl ether, and many other similar solvents. Solvents, if used, should be dried thoroughly. In addition, when preparing poly(ethylsilyne), the solvent must be added very slowly, e.g., drop-wise, for at least the first two milliliters of the solvent, to prevent a violent reaction and possible explosion.

The reaction is carried out under an inert atmosphere. Sonication is carried out to produce a homogeneous mixture, for example, for at least about three minutes, e.g., at least about 5, 10, or 15 minutes.

After sonication is complete, the reaction mixture is refluxed under an inert atmosphere for a time suitable to drive the reaction to completion, e.g., at least about 6, 8, 10, 12, 18, 20, or 24 hours. If this reflux is not performed in the synthesis of PMSy, a white, intractable solid is formed. On the other hand, such a reflux step has been found to degrade other polysilynes.

After the first reflux step, the polymer is end-capped by exposure to an appropriate amount of an alkylating agent. Such alkylating agents include, for example, alkyllithiums such as methyllithium, and Grignard reagents such as methyl magnesium bromide. After end-capping, the mixture is refluxed a second time under an inert atmosphere for a further period to complete the reaction, for example, for at least 6, 8, 10, 12, 18, 20, or 24 hours. Again, if this reflux step is not done in the synthesis of PMSy, a white intractable solid is formed.

Quenching the reaction after the second reflux step directly with water produces the desired yellow PMSy polymer. Handling of the material under an inert atmosphere is no longer required after quenching. Dehalocoupling reactions of halosilanes are typically quenched with methanol, to consume any unreacted alkali metal. Previously published polysilyne syntheses, and other silicon polymer syntheses, use sequential precipitation from alcohols, including methanol, as a purification step. However, we have found that contact of the polymer with any alcohol causes instantaneous, irreversible polymer degradation to a white intractable solid, and thus must be avoided in the new methods described herein.

The polymers produced according to these methods have a molecular weight from about 1,000 to about 20,000, e.g., about 1,000, 2,500, 5,000, 7,000, 10,000, or 15,000.

Uses of Poly(methyl- or ethyl-silyne)

The polymers can be applied to surfaces using standard coating techniques to form silicon carbide (SiC) films. The polymers can be applied in any desired thickness, by dissolution to any suitable concentration in any suitable solvent described above. The polymers can also be spun onto surfaces, or applied to objects according to conventionally known methods. The polymers can also be formed into fibers by using fiber-pulling machines known to those of skill in the art.

SiC formation takes place by heating, or by plasma- or laser-induced processes. For example, heating to at least about 200° C. can lead to forms of SiC that are incompletely crystallized. Higher temperatures, e.g., about 500, 750, 850, 1000, 1200, or about 1500° C., or increased pressures, e.g., 2 or 3 atmospheres, can produce SiC of a higher degree of crystallinity. Plasma- or laser-induced SiC formation can take place at room temperature, since local heating will produce SiC. Low temperature SiC formation can also be assisted by adding seed crystals of SiC.

The performance of ceramic SiC and the applications for which it can be used are very much dependent on ceramic composition. Crystalline forms of SiC can be desirable for use in electronics applications, for example, for their thermal conduction properties. Incompletely crystallized forms of SiC can be desirable if films of SiC are to be produced on substrates which are sensitive to the conditions required for producing substantially crystalline SiC. Films of virtually any thickness can be produced. Fibers can be desirably produced in incompletely crystallized forms. Amorphous forms of SiC can also be desirable for applications not requiring such demanding physical properties.

The highly pure SiC produced by these processes can be used in electronics applications for protective coatings, and for thermal transfer applications. Hard drive coatings can be made including SiC. This material can also be incorporated into commonly used items such as boat hulls or tennis racquets. In addition, poly(methylsilyne) can be used to create bulk objects such as molded objects.

Formation of SiC by heat or plasma processing, or under chemically reactive atmospheres (such as $NH_3$, $H_2$, $CH_4$ or $SiH_4$), can be used to tailor the new ceramic compositions to form $Si_xC_yN_z$ and can turn PMSy into a ceramic precursor of unrivalled versatility. Processing under methane, for example, can alter the Si:C ratio further toward carbon or to create carbon rich $Si_xC_y$ material. This excess silicon or carbon is incorporated into the ceramic, and not present as elemental silicon or carbon. Processing under hydrogen gas allows scavenging of hydride or excess carbon to alter the Si:C ratio toward silicon. Processing under silane can also alter the Si:C ratio to increase the silicon content of the material. Processing under ammonia may introduce Si—N into the silicon carbide, which is generally conventionally possible by sputtering.

The invention will be further described in the following examples, which do not limit the scope of the invention described in the claims.

EXAMPLES

The following examples illustrate particular advantages and properties of the materials and methods described herein. All the reactions were carried out under an argon atmosphere, by means of standard Schlenk manipulations or inside a glove box. Anhydrous pentane and tetrahydrofuran were purchased from Aldrich and were dried over sodium metal and benzophenone and distilled prior to their use. Methyltrichlorosilane (99%) was purchased from VWR and used as received. Methyllithium (1.4M in diethyl ether) was purchased from Aldrich and used as received. Liquid 1:1 mole ratio NaK alloy was prepared in a glove box by adding solid potassium to an equimolar amount of molten sodium.

$^1$H NMR (200.1 MHz) spectra were recorded on a Bruker AC200®. $^{13}$C NMR (75.4 MHz) spectra were recorded on a Bruker DPX300®. $^{29}$Si NMR (99.4 MHz) spectra were recorded on a Bruker AMX500®, using a Bruker 5 mm broadband direct probe. A distortion-less enhanced proton transfer-45 (DEPT45) sequence was run with J=7 Hz. In all cases, $d^8$-tetrahydrofuran was used as the solvent at room temperature. FTIR transmission spectra were obtained using a Midac® M12-SP3 spectrometer, operating at 4 cm$^{-1}$ resolution with neat film samples between salt plates or with KBr pellets. Oxygen incorporation studies were done using a Rayoner® RPR-100 photochemical reactor. UV/Vis spectra were measured at room temperature, in $3\times10^{-4}$ M cyclohexane solution using a Shimadzu RUV-260® spectrometer. The molecular weights of the polymers were determined versus polystyrene standards on a Polymer Labs LC1120® HPLC pump, fitted with an IBM LC9563 UV detector, using tetrahydrofuran as a solvent.

As a control, poly(n-hexyl)silyne (PnHS) was synthesized using the method of Bianconi et al., *J. Am. Chem. Soc.*, 7, 2342 (1988). Pyrolysis studies of PMSy and poly(n- hexyl) silyne (PnHS) were performed using a Thermolyne 12110® tube furnace; all studies were done under a dynamic argon flow and a heating rate of 10° C./minute. Ceramic yields are quoted as percentage weight retention. Films of PMSy and PnHS were spun at 1000 rpm for 10 minutes on AlTiC substrates with an alumina basecoat, on a Headway Research Inc. Photo Resist spinner model 1-EC101DT-435®, from a 0.2 g/mL PMSy/THF solution. Film thickness and roughness measurements were obtained using a Tencor Instruments Alpha Step 500 Surface Profiler®. Scanning electron micrographs (SEM) were taken on a JOEL JSM-35CF® scanning microscope. Energy Dispersive X-ray spectroscopy (EDS) was carried out using a JOEL 6320 FXV scanning microscope configured with a PGT Imix Xe X-ray microanalysis system; a 100-second collection time was used for X-ray spectral analysis. Spectra were then quantified as weight percents for Si and C. The XRD pattern was recorded on a Siemens D-500 diffractometer in transmission geometry with a Ni filtered CuKα radiation.

Example 1

Preparation of PMSy

An oven-dried 400 mL beaker containing anhydrous pentane (250 mL) and 7.474 g (50 mmol) of methyltrichlorosilane, was placed in a nitrogen atmosphere drybox equipped with a high intensity (475 W, 20 KHz, ½ inch tip) ultrasonic immersion horn. The solvent and methyltrichlorosilane were irradiated at full power by immersion of the horn for 3 minutes. 4.42 g (143 mmol) of NaK alloy was added slowly drop-wise over a period of 5 minutes. Sonication was continued for a further 8 minutes after addition was complete. 200 ml of THF was then added to the reaction mixture, and sonication continued for a further 8 minutes.

At this time the dark blue reaction mixture was transferred to reflux apparatus and transferred to a Schlenk line. The mixture was refluxed gently for 24 hours, under a dynamic flow of argon, in which time the reaction mixture had turned brown in color. At this time, 7.0 mL of methyllithium (1.4 M in diethyl ether) was added to end-cap the PMSy polymer. Thereafter, reflux was continued for a further 24 hours, again under a dynamic argon flow. 100 mls of water were added with vigorous stirring to quench the reaction mixture. There was no longer a need for an inert atmosphere at this point. On transferring to a separating funnel, separation of the aqueous and organic layers occurred. A yellow organic layer was isolated from the clear aqueous layer and the solvent removed under vacuum. Yields of 50–70% were typically obtained.

Characterization of poly(methylsilyne) was done by UV/Vis, FTIR, $^1$H, $^{13}$C, $^{29}$Si NMR spectroscopies, GPC, and by elemental analyses. As indicated below, all data is consistent with the formation of PMSy. It should be noted that PMSy is not pyrophoric, providing a considerable advantage over many other SiC polymer precursor systems.

FTIR (neat, cm$^{-1}$ (assignment)): 2973, 2862 (ν C—H, SiCH$_3$), 2070 (ν Si—H) 1460, 1245 (δ C—H, SiCH$_3$), 1069 (ν Si—O—Si), 836 (ρ CH$_3$), 911 (γ SiH$_2$), 774, 685 (ν Si—C). $^{13}$C NMR (ppm assignment): –3.0, very broad, (SiCH$_3$). $^{29}$Si NMR (ppm assignment): –74.5 (SiCH$_3$), –66.3 (HSiCH$_3$), –37.3 and –33.1 (Si(CH$_3$)H$_2$), –21.4 and –15.5 (CH$_3$SiCH$_3$ (linear fragments and Si(CH$_3$)$_2$ end groups), +8.1 ((CH$_3$)$_3$Si). $^1$H NMR (ppm assignment): 0.37, very broad (SiCH$_3$), 3.45, broad, (SiH, SiH$_2$). Elemental analyses: Found (C 29.14%, H 8.37%, Cl<0.2%); Calculated for (CH$_3$Si)$_n$ (C 27.85%, H 7.01%).

The UV/Vis spectrum of PMSy is shown in FIG. 1. It shows a broad and intense absorption in the UV, which tails off into the visible (at about 500 nm). This feature is characteristic of polysilynes and is attributed to extension of Si—Si (δ-"conjugation" into three dimensions, and differentiates polysilynes from linear polysilanes which exhibit strong δ–δ* transitions ($\lambda_{max}$=300–350 nm).

Figure 2:
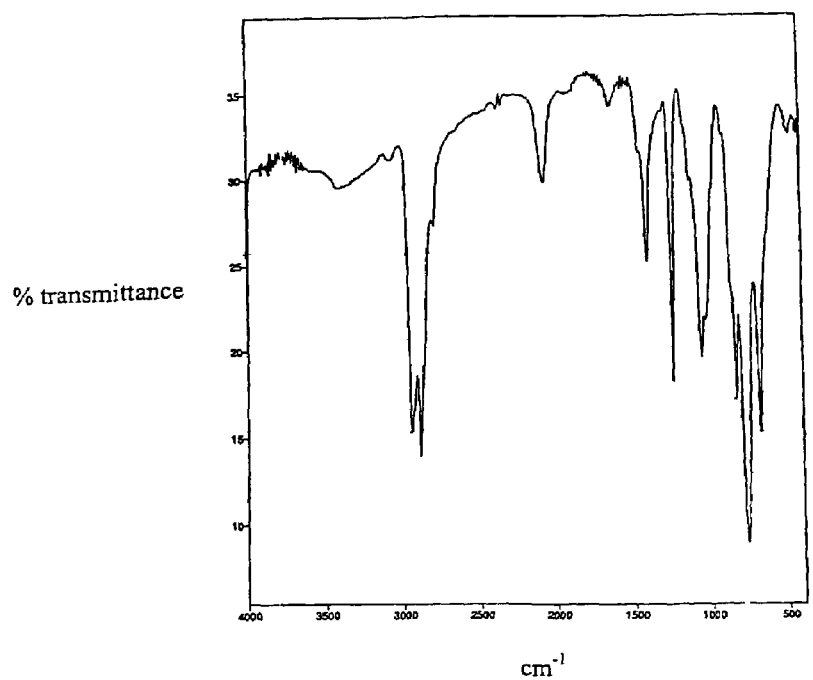
FIG. 2 is a Fourier Transform Infrared spectrum of poly(methylsilyne).
Figure 3:
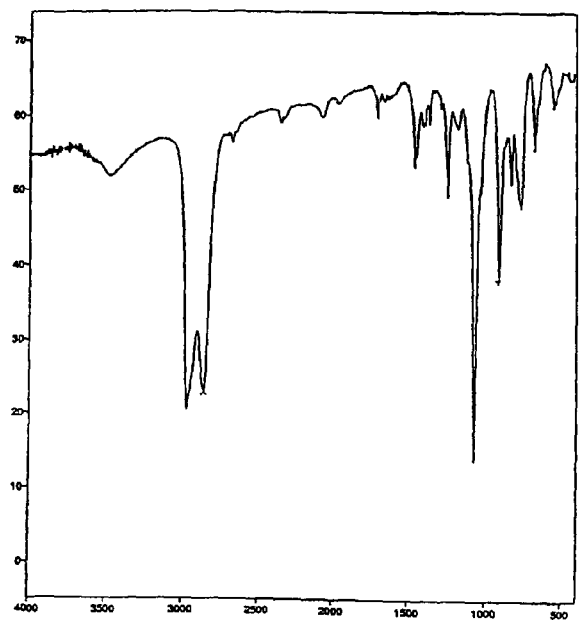
FIG. 3 is a Fourier Transform Infrared spectrum of poly(methylsilyne) with an extended reflux period and after addition of iodomethane.

The FTIR spectrum of PMSy is shown in FIG. 2. This spectrum is consistent with that expected for PMSy. It is notable that the ν Si—H and γ SiH$_2$ bands are much less intense than in recently reported polymer precursors to SiC. This is manifested in the fact that the polymer is not pyrophoric and can be readily handled in air, for short time periods. The ν Si—H (2070 cm$^{-1}$) and γ SiH$_2$ (911 cm$^{-1}$) bands can be almost entirely eliminated by the addition of a couple of mls of iodomethane to the reaction mixture (after addition of the MeLi) and reflux for a further 24 hours (as shown in FIG. 3). Freshly prepared PMSy also shows relatively few Si—O—Si moieties, as evidenced by the sharp peak at 1069 cm$^{-1}$. Typically, the presence of large numbers of Si—O—Si units gives a broad absorption in this region. The absence of residual Si—Cl in PMSy as evidenced by the absence of bands in the 498–525 cm$^{-1}$ region is also notable. When handled in air for prolonged times and in the direct presence of UV light, PMSy becomes insoluble due to the incorporation of oxygen into the Si—Si backbone.

The $^1$H NMR spectrum (not shown) also confirms that the product is almost entirely PMSy. The resonance at +3.45 ppm (SiH, SiH$_2$) is very small compared to the broad resonance at +0.37 ppm (SiCH$_3$). Resonances above +5 ppm are not observed; these would be attributable to SiHCl or SiOH. As mentioned, the SiH, SiH$_2$ signals can be removed by addition of iodomethane. The $^{13}$C NMR spectrum (not shown) indicates only the presence of SiCH$_3$ as expected.

Figure 4:
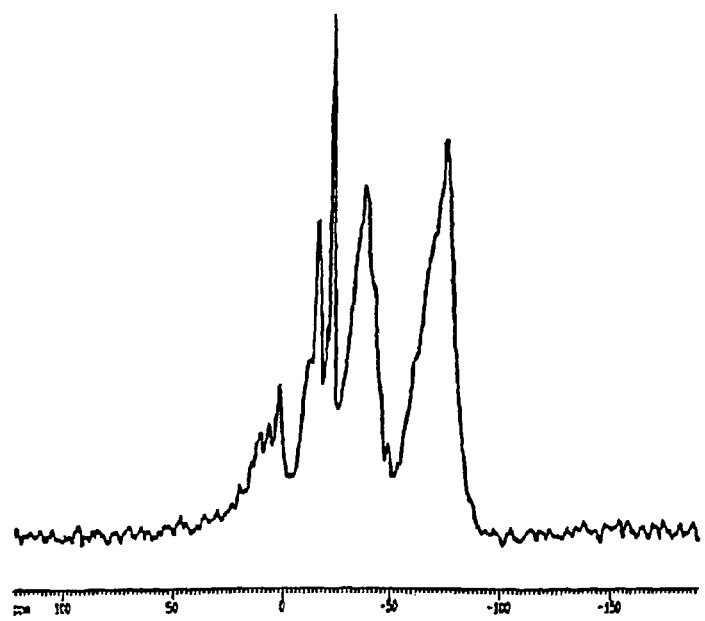
FIG. 4 is a $^{29}$Si—NMR spectrum of poly(methylsilyne).

The $^{29}$Si NMR is shown in FIG. 4. The broad resonance at –74.5 ppm is expected, and is attributable to methyl groups on the silicon backbone. This spectrum also shows the presence of other silicon moieties.

The elemental analysis of PMSy was very close to the expected composition. It shows that the polymer is slightly rich in both carbon and hydrogen, which is to be expected from FTIR, $^1$H and $^{29}$Si NMR. Cl<0.2% is consistent with all other data. Si analyses are notoriously difficult to obtain from these silicon polymers.

Gel permeation chromatography (GPC) analysis of the polymer reveals polydispersity in PMSy. Generally, we formed polymers of M$_w$≈7000 with a wide polydispersity (4). We also formed polymers with molecular weights up to about 20,000, and with polydispersity of about 7. We have also formed brown insoluble powders, and these may be even higher molecular weight versions of PMSy, which would account for the insolubility.

Figure 5:
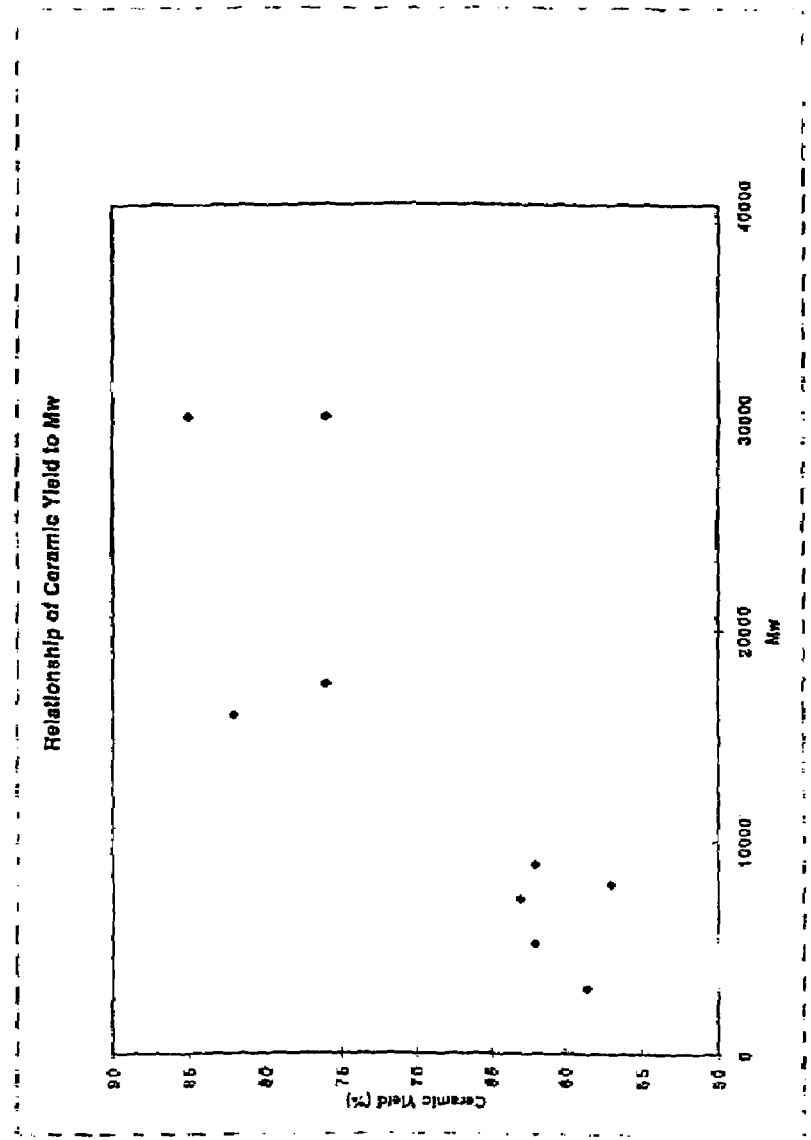
FIG. 5 is a graph of % ceramic yield of SiC vs. molecular weight of poly(methylsilyne).

Pyrolysis studies confirm that that the major weight loss process for PMSy occurs in the region 200–450° C. The ceramic yield is very much dependent on the molecular weight of the polymer, as shown in the graph in FIG. 5, which shows the percentage ceramic yield of SiC vs. molecular weight of poly(methylsilyne). In approximately 50% of the pyrolysed samples a black-colored ceramic is obtained. However, in the remaining half of the samples the ceramic displays light brown to pale yellow coloration. This coloring is indicative of extremely high purity silicon carbide, as observed by Greenwood and Earnshaw, *Chemistry of the Elements*, Pergammon Press, New York, (1989), 386.

Example 2

Preparation of PEtSy

An oven-dried 400 mL beaker containing anhydrous pentane (250 mL) and 7.474 g (50 mmol) of ethyltrichlorosilane, was placed in a nitrogen atmosphere drybox equipped with a high intensity (475 W, 20 KHz, ½ inch tip) ultrasonic immersion horn. The solvent and ethyltrichlorosilane were irradiated at full power by immersion of the horn for 3 minutes. 4.42 g (143 mmol) of NaK alloy was added slowly drop-wise over a period of 5 minutes. Sonication was continued for a further 8 minutes after addition was complete. 200 ml of THF was then added to the reaction mixture very slowly, e.g., drop-wise for the first 2 or 3 mL, and sonication continued for a further 8 minutes.

At this time the dark blue reaction mixture was transferred to reflux apparatus and transferred to a Schlenk line. The mixture was (optionally) refluxed gently for about 12 hours, under a dynamic flow of argon, during which time the reaction mixture had turned brown in color. At this time, 7.0 mL of methyllithium (1.4 M in diethyl ether) was added to end-cap the PEtSy polymer. Thereafter, reflux was continued for a further 24 hours, again under a dynamic argon flow. 100 mls of water were added with vigorous stirring to quench the reaction mixture. There was no longer a need for an inert atmosphere at this point. On transferring to a separating funnel, separation of the aqueous and organic layers occurred. A yellow organic layer was isolated from the clear aqueous layer and the solvent removed under vacuum. Yields of 50–70% were typically obtained.

Example 3

Preparation of Silicon Carbide (SiC)

PMSy heated to pyrolysis temperatures of 1000° C., under argon, produced SiC in high yield (up to 85%, by weight loss, which is close to the theoretical yield expected for this polymer). During heating, the temperature was slowly ramped up at a rate of 10° C./minute, and held at 250° C. for about 2 hours before continuing to increase the temperature.

The ceramic yield is very much dependent on the molecular weight of the polymer, which is a well-known attribute of these types of polymers. Purity is confirmed by elemental analysis of the ceramic: C, 27.30; Si, 61.20; Σ=88.50; Calcd for SiC: C, 29.95; Si, 70.05. This equates to SiC with the formula $SiC_{1.04}$ or a ceramic with the composition 1.08% C+98.92 SiC. Energy dispersive spectroscopy (EDS) analysis of the ceramic film formed from PMSy on the alumina substrate reveals the high purity of the ceramic product: Pound C 29.95%, Si 70.05%; Calcd for SiC: C, 29.95; Si, 70.05, or a ceramic with the composition of 100% SiC with Si and C present in a perfect 1:1 ratio. Such analytically pure ceramic has not been obtained from use of other polymer precursor systems.

Example 4

Preparation of PMSy Films

Figure 6:
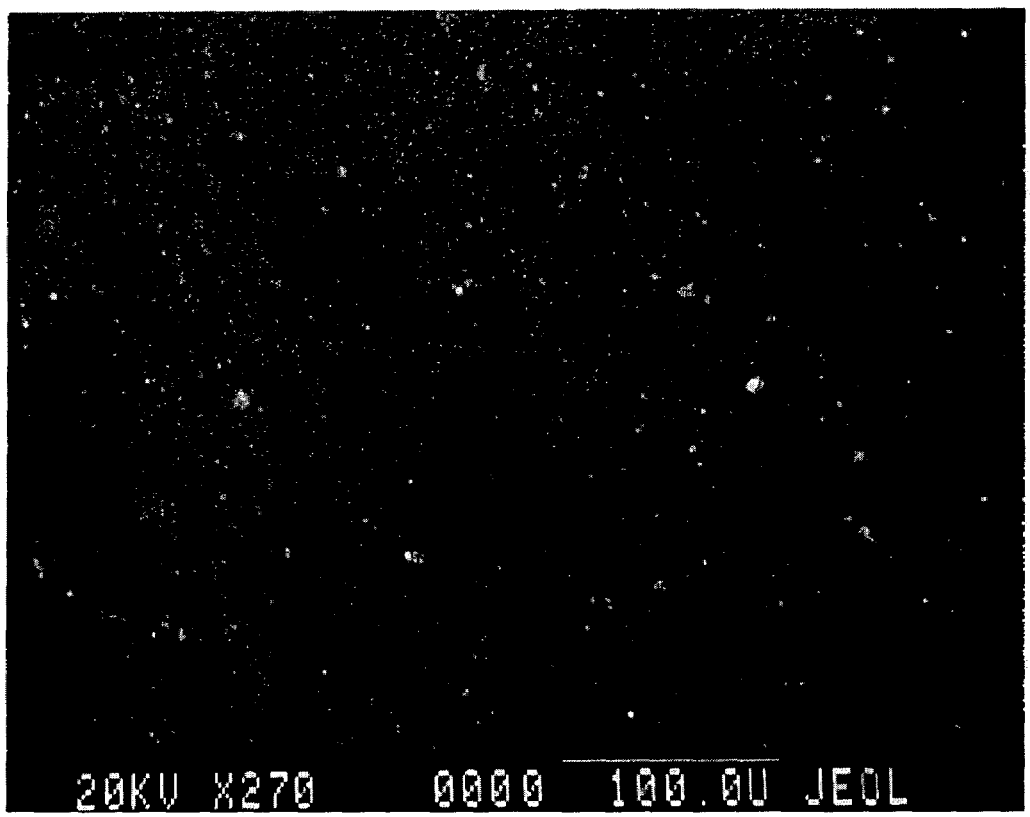
FIG. 6 is a photograph of a silicon carbide film produced according to a particular embodiment of the invention.

Samples of PMSy were spun onto alumina substrates to obtain uniform and smooth films of PMSy (2 μm thick, mean square roughness (Rq)=200–300 Å, scanned over 2 mm). Heating these films to 1000° C. produced smooth ceramic films of uniform thickness (1 μm thick, Rq=170 Å, scanned over 2 mm), as measured by. A photograph of this material is shown in FIG. 6. The smoothness indicates a dense, homogeneous ceramic film (in the area scanned), without pores, cracks, or other defects; such high-quality ceramic is not reported from use of other polymer precursor systems, absent further polishing. The ceramic films produced were adherent to the substrates, resistant to removal by plastic adhesive tape, and were completely uniform.

Example 5

Comparisons with Other Films

Figure 7A:
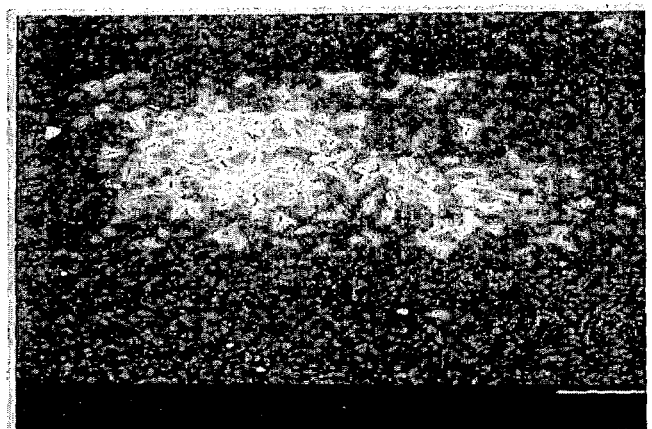
FIGS. 7A and 7B are photographs of a prior art silicon carbide film produced from a polymethysilane precursor (from Czubarow et al., Macromolecules, 31:229, 1998).
Figure 7B:
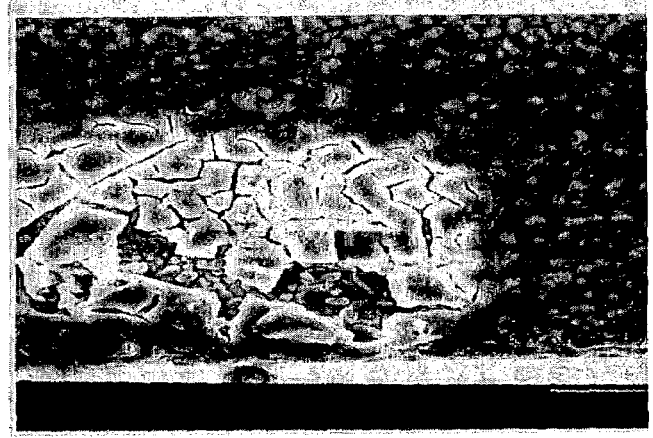

FIGS. 7A and 7B are published photographs of an SiC film made from a polymer precursor (polymethylsilane) heated to 1000° C., under argon. As shown, the film had significant defects and was not continuous. The figures are from Czubarow et al., Macromolecules, 31, 229, (1998).

Figure 8:
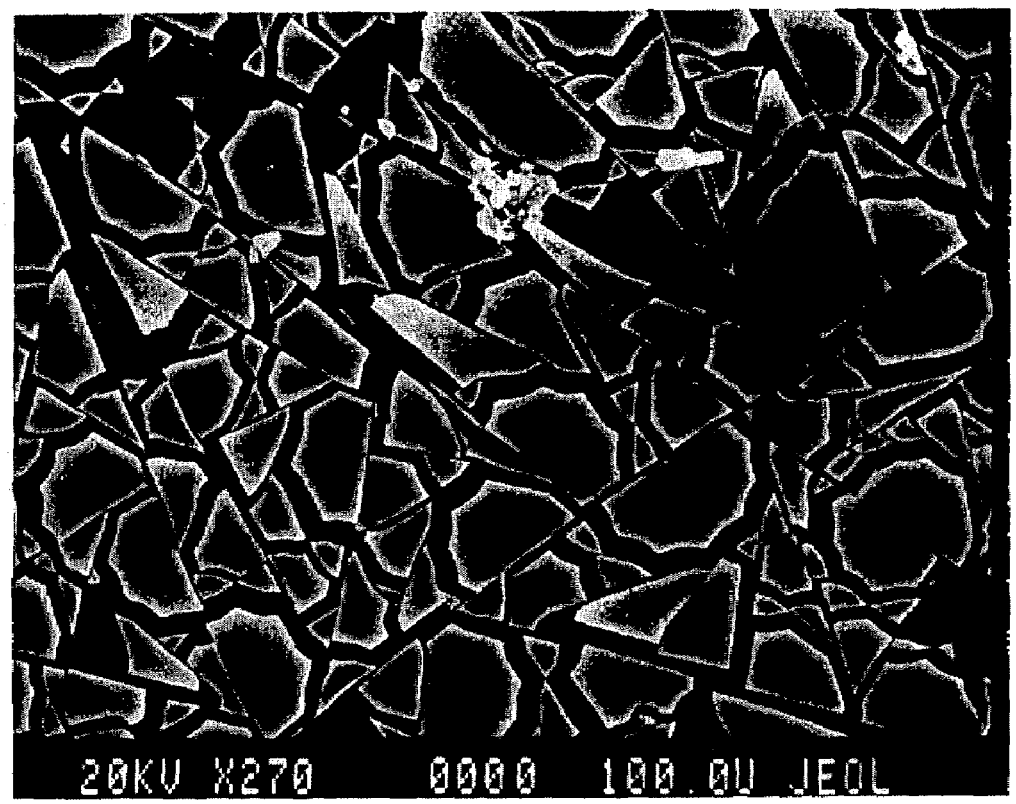
FIG. 8 is a photograph of a silicon carbide film produced from poly(n-hexyl)silyne.

The improved ceramic-producing behavior of PMSy over other polysilynes, such as poly(n-hexyl)silyne, is shown in FIG. 8. A film of poly(n-hexyl)silyne is shown after being spun onto an alumina substrate and pyrolysed. Severe cracks and inhomogeneities are seen in the resulting ceramic film. This is believed to result from loss of most of the mass of the n-hexyl side chain during pyrolysis, leading to high weight loss and low ceramic yield.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of making a poly(methylsilyne), the method comprising:
    a) contacting a halogenated methylsilane with a metallic reagent to produce a reaction mixture;
    b) homogenizing the reaction mixture to produce a homogenized reaction mixture;
    c) adding to the homogenized reaction mixture a solvent to aid in completing the reaction;
    d) refluxing the homogenized reaction mixture for at least about 6 hours to produce a first refluxed reaction mixture;
    e) contacting the first refluxed reaction mixture with an alkylating agent to produce an end-capped reaction mixture;
    f) refluxing the end-capped reaction mixture to produce a second refluxed reaction mixture; and
    h) quenching the second refluxed reaction mixture with an aqueous solvent that lacks any alcohol to produce non-pyrophoric poly(methylsilyne).

2. The method of claim 1, wherein the aqueous solvent is water.

3. The method of claim 1, wherein the solvent is tetrahydrofuran.

4. The method of claim 1, wherein the halogenated methylsilane is methyltrichlorosilane.

5. The method of claim 1, wherein the metallic reagent is a sodium potassium alloy.

6. The method of claim 1, wherein the alkylating agent is methyl lithium.

7. The method of claim 1, wherein the halogenated methyl silane is mixed with a non-polar solvent.

8. The method of claim 7, wherein the non-polar solvent is pentane.

9. The method of claim 1, wherein ultrasound is used to perform the homogenization.

10. A method of making a poly(ethylsilyne), the method comprising:
    a) contacting a halogenated ethylsilane with a metallic reagent to produce a reaction mixture;
    b) homogenizing the reaction mixture to produce a homogenized reaction mixture;
    c) adding to the homogenized reaction mixture a solvent, wherein at least 1.0 ml of the solvent is added dropwise, to aid in completing the reaction;
    d) adding to the homogenized reaction mixture methyl lithium to produce an end-capped reaction mixture; and
    e) quenching the end-capped reaction mixture with an aqueous solvent that lacks any alcohol to produce non-pyrophoric poly(ethylsilyne).

11. The method of claim 10, wherein the aqueous solvent is water.

12. The method of claim 10, wherein the solvent is tetrahydrofuran.

13. The method of claim 10, wherein the halogenated ethylsilane is ethyltrichlorosilane.

14. The method of claim 10, wherein the metallic reagent is a sodium potassium alloy.

15. The method of claim 10, wherein the halogenated ethylsilane is mixed with a non-polar solvent.

16. The method of claim 15, wherein the non-polar solvent is pentane.

17. The method of claim 10, wherein ultrasound is used to perform the homogenization.

18. The method of claim 10, further comprising refluxing the homogenized reaction mixture.

19. The method of claim 10, further comprising refluxing the end-capped reaction mixture.

20. A method of making a ceramic, the method comprising
    forming poly(methylsilyne) by the method of claim 1; and
    heating the poly(methylsilyne) to a temperature of at least 200° C. to form the ceramic.

21. The method of claim 20, wherein the poly(methylsilyne) is heated to at least 1000° C.

22. The method of claim 20, wherein the ceramic is within 5% of stoichiometric.

23. The method of claim 20, wherein the poly(methylsilyne) is heated by exposure to a plasma.

24. The method of claim 20, wherein the poly(methylsilyne) is heated by exposure to a laser.

25. The method of claim 20, wherein the ceramic is silicon carbide.

26. The method of claim 20, wherein the ceramic has a mean square roughness of less than 200 Å, scanned over 5 microns.

27. A method of making a ceramic, the method comprising
   forming poly(ethylsilyne) by the method of claim 10; and
   heating the poly(ethylsilyne) to a temperature of at least 200° C. to form the ceramic.

28. The method of claim 27, wherein the poly(ethylsilyne) is heated to at least 1000° C.

29. A method of forming a film of poly(methylsilyne), the method comprising
   forming poly(methylsilyne) by the method of claim 1;
   solubilizing the poly(methylsilyne) in a solvent; and
   coating the solubilized poly(methylsilyne) onto a substrate to form a film.

30. The method of claim 29, wherein the solvent is tetrahydrofuran.

31. A method of forming a film of poly(ethylsilyne), the method comprising
   forming poly(ethylsilyne) by the method of claim 10;
   solubilizing the poly(ethylsilyne) in a solvent; and
   coating the solubilized poly(ethylsilyne) onto a substrate to form a film.

32. The method of claim 31, wherein the solvent is tetrahydrofuran.

33. A method of making a poly(ethylsilyne), the method comprising:
   a) contacting a halogenated ethylsilane with a metallic reagent to produce a reaction mixture;
   b) homogenizing the reaction mixture to produce a homogenized reaction mixture;
   c) adding to the homogenized reaction mixture a solvent, wherein at least 1.0 ml of the solvent is added dropwise, to aid in completing the reaction;
   d) adding to the homogenized reaction mixture an alkylating agent to produce an end-capped reaction mixture;
   e) refluxing the end-capped reaction mixture; and
   f) quenching the end-capped reaction mixture with an aqueous solvent that lacks any alcohol to produce non-pyrophoric poly(ethylsilyne).

34. The method of claim 33, wherein the halogenated ethylsilane is ethyltrichlorosilane.

35. The method of claim 33, wherein the metallic reagent is a sodium potassium alloy.

36. The method of claim 33, wherein the alkylating agent is methyl lithium.

* * * * *